(12) United States Patent
Sæthre

(10) Patent No.: US 11,511,212 B2
(45) Date of Patent: Nov. 29, 2022

(54) OIL DEHYDRATOR, A SYSTEM FOR DEHYDRATING OIL COMPRISING AN OIL DEHYDRATOR AND A METHOD FOR DEHYDRATING OIL WITH AN OIL DEHYDRATOR

(71) Applicant: ALFA LAVAL CORPORATE AB, Lund (SE)

(72) Inventor: Nils Rune Sæthre, Frekhaug (NO)

(73) Assignee: ALFA LAVAL CORPORATE AB, Lund (SE)

( * ) Notice: Subject to any disclaimer, the term of this patent is extended or adjusted under 35 U.S.C. 154(b) by 996 days.

(21) Appl. No.: 16/334,635

(22) PCT Filed: Oct. 25, 2016

(86) PCT No.: PCT/EP2016/075594
§ 371 (c)(1),
(2) Date: Mar. 19, 2019

(87) PCT Pub. No.: WO2018/001536
PCT Pub. Date: Jan. 4, 2018

(65) Prior Publication Data
US 2020/0129880 A1 Apr. 30, 2020

(30) Foreign Application Priority Data
Jul. 1, 2016 (EP) .................... 16177418

(51) Int. Cl.
*B01D 3/10* (2006.01)
*B01D 1/16* (2006.01)
(Continued)

(52) U.S. Cl.
CPC ............ *B01D 3/106* (2013.01); *B01D 1/16* (2013.01); *B01D 3/42* (2013.01); *C10G 7/04* (2013.01);
(Continued)

(58) Field of Classification Search
CPC ...... B01D 3/106; B01D 3/16; B01D 19/0063; C10G 7/04; C10G 7/06; C10G 33/06; C10G 33/08
See application file for complete search history.

(56) References Cited

U.S. PATENT DOCUMENTS

| 4,561,866 A | 12/1985 | Altmann et al. |
| 4,681,660 A | 7/1987 | Budny |
(Continued)

FOREIGN PATENT DOCUMENTS

| CN | 200948367 Y | 9/2007 |
| CN | 102176954 A | 9/2011 |
(Continued)

OTHER PUBLICATIONS

Notice of Allowance dated Aug. 19, 2020, by the Korean Intellectual Property Office in corresponding Korean Patent Application No. 10-2019-7003396 and an English Translation of the Notice of Allowance. (3 pages).

(Continued)

*Primary Examiner* — Renee Robinson
(74) *Attorney, Agent, or Firm* — Buchanan Ingersoll & Rooney PC

(57) ABSTRACT

An oil dehydrator, comprising; a vacuum chamber, a vacuum pump arranged at an upper end region of the vacuum chamber for establishing a negative pressure within the vacuum chamber and for fluid transportation of water and air out from the vacuum chamber through an outlet opening, and a pipe for fluid transportation of oil into and/or out from the vacuum chamber, where the pipe is connected to a lower end region of the vacuum chamber, wherein the vacuum chamber at the lower end region has at least one flow channel fluidly connecting the vacuum chamber and the pipe, wherein an orifice check valve is arranged between the vacuum chamber and the pipe for controlling the flow of oil (Continued)

into and out from the vacuum chamber through the at least one flow channel.

20 Claims, 10 Drawing Sheets

(51) Int. Cl.
*C10G 33/08* (2006.01)
*C10G 7/04* (2006.01)
*C10G 7/06* (2006.01)
*B01D 3/42* (2006.01)
*C10G 7/12* (2006.01)
*C10G 33/06* (2006.01)

(52) U.S. Cl.
CPC .................. *C10G 7/06* (2013.01); *C10G 7/12* (2013.01); *C10G 33/06* (2013.01); *C10G 33/08* (2013.01)

(56) References Cited

U.S. PATENT DOCUMENTS

| | | | |
|---|---|---|---|
| 5,211,856 A | 5/1993 | Shen | |
| 5,316,181 A | 5/1994 | Burch | |
| 5,785,075 A | 7/1998 | Uchida et al. | |
| 6,383,367 B1 * | 5/2002 | Grotheim ........... | B01D 17/0205 210/220 |
| 8,118,921 B2 | 2/2012 | Ingvast et al. | |
| 8,177,895 B2 | 5/2012 | Ingvast et al. | |
| 2006/0003882 A1 | 1/2006 | Smith | |
| 2009/0145823 A1 | 6/2009 | Lauer et al. | |
| 2011/0108408 A1 | 5/2011 | Gracia et al. | |
| 2015/0017020 A1 | 1/2015 | Trott | |

FOREIGN PATENT DOCUMENTS

| | | | |
|---|---|---|---|
| CN | 203442236 | U | 2/2014 |
| EP | 3 263 199 | A1 | 1/2018 |
| JP | H05-005644 | A | 1/1993 |
| JP | 2013-510709 | A | 3/2013 |
| KR | 10-1997-0074477 | A | 12/1997 |
| KR | 10-2009-0010213 | A | 1/2009 |
| SU | 406070 | A2 | 11/1973 |
| SU | 1417907 | A1 | 8/1988 |
| WO | 9965588 | A1 | 12/1999 |
| WO | 2010042663 | A2 | 4/2010 |
| WO | 2010/042663 | A3 | 8/2010 |

OTHER PUBLICATIONS

Office Action (The First Office Action) dated Aug. 21, 2020, by the State Intellectual Property Office of People's Republic of China in corresponding Chinese Patent Application No. 201680087312.8 and an English Translation of the Office Action. (17 pages).

Notice of Allowance (Decision to Grant a Patent) dated Aug. 31, 2020, by the Japanese Patent Office in corresponding Japanese Patent Application No. 2018-567821 and an English Translation of the Notice of Allowance. (5 pages).

International Search Report (PCT/ISA/210) dated Apr. 20, 2017, by the European Patent Office as the International Searching Authority for International Application No. PCT/EP2016/075594.

Written Opinion (PCT/ISA/237) dated Apr. 20, 2017, by the European Patent Office as the International Searching Authority for International Application No. PCT/EP2016/075594.

Office Action (Communication pursuant to Article 94(3) EPC) dated Jun. 21, 2022, by the European Patent Office in corresponding European Patent Application No. 16 787 800.8-1101. (6 pages).

* cited by examiner

OIL DEHYDRATOR, A SYSTEM FOR DEHYDRATING OIL COMPRISING AN OIL DEHYDRATOR AND A METHOD FOR DEHYDRATING OIL WITH AN OIL DEHYDRATOR

TECHNICAL FIELD

The present disclosure relates to an oil dehydrator, comprising; a vacuum chamber, a vacuum pump for establishing a negative pressure within the vacuum chamber and for fluid transportation of water and air out from the vacuum chamber through an outlet opening, and a pipe for fluid transportation of oil into and out from the vacuum chamber. The disclosure further relates to a system for dehydrating oil comprising an oil dehydrator and a method for dehydrating oil with an oil dehydrator.

BACKGROUND

An oil dehydrator is used for dehydrating oils, such as gear, lubricating, compressor, or hydraulic oils, that have been contaminated with water. Water contamination of oil is a common problem in many industrial applications and the need for dehydrating oils are increasing with new and more environmental friendly oil qualities that often are more hygroscopic and absorb more water.

In a typical industrial oil system the oil can be contaminated with water in different ways, such as for example through leakage of water into the oil system or from transportation of water vapour contained in humid air. All forms of water in the oil may have direct consequences to the oil system, such as for example changes in TAN (total acid number), pH and viscosity.

Water coexists with oil in either a dissolved state, an emulsified state or in a free state, where the dissolved state is the lowest level of moisture contamination of many oil types. Water in the free state is separate from the oil in the system and can many times be visually identified. The specific gravity of most oils is less than the specific gravity of water, so water usually collects at the bottom of for example reservoirs in the oil system and due to this reason free water may be removed by draining through a reservoir drain port. In the emulsified state, the water has blended with the oil. Water in the emulsified state will mostly remain in the blended state and not separate from the oil like free water. In the dissolved state, water has been dissolved into the oil. When the temperature of the oil increases, the capacity to absorb water increases, and when the oil cools down with a high level of dissolved water, the free water comes out of the oil. The dissolved water is derived from ambient air humidity slowly interacting with the oil over time. Usually, the older the oil gets, the more hygroscopic the oil will become.

The water saturation point of an oil is the point above which water is in free form. For many oils, the water saturation point is 200-600 ppm, and for environmentally friendly oils 1000-5000 ppm, depending on the age and condition of the oil. If an oil system for example requires a water saturation point of 100 ppm as an upper limit, the free and emulsified water as well as a significant portion of the dissolved water must be removed from the oil in order to meet the system requirements.

To manage the water contaminated oil, a traditional oil dehydrator of the vacuum type can be used for dehydrating the oil so that free water, emulsified water and a high portion of the dissolved water is removed from the oil. A traditional oil dehydrator of the vacuum type can be used for dehydrating oils in oil systems or oil reservoirs. Typically, this type of traditional oil dehydrators are first heating the oil if necessary and are thereafter applying a negative pressure to the oil so that the water contaminating the oil is evaporating and the water vapour formed can be transported away from the oil system.

Traditional oil dehydrators of the vacuum type are for example disclosed in the patent documents U.S. Pat. Nos. 4,681,660 A, 5,211,856 A, WO 99/65588 A1 and CN 200948367 Y. Other types of oil dehydrators are also known, such as positive pressure dehydrators. A dehydrator of this type is disclosed in patent document WO 2010/042663 A2.

There are many disadvantages with this traditional type of oil dehydrators. For example, they are heavy and complicated in construction, which means that they need to be built on a wheeled platform or placed on a trolley so that the oil dehydrator can be transported between different oil cleaning locations. Further, the oil dehydrators of this type are very costly to produce and thus expensive to purchase for a user, especially if they should be used in hazardous locations or explosion proof areas, where the electrical components must be specifically designed and tested. If for example many oil dehydrators are needed within an industry or on a ship, high investments in these systems are needed. Another problem is that when an oil dehydrating process has been completed, a high volume of oil residues are contained in the oil dehydrator due to the design of the oil dehydrator. This means that there is a risk that one type of oil can be contaminated with oil residues of another type if oil systems with different types of oil are being cleaned.

There is thus a need for an improved oil dehydrator which is; efficient, easy and flexible to use, also in explosion proof areas; lightweight in construction; simple to produce at a cost that is much lower than the cost of traditional oil dehydrators; and possible to use in systems with different oils without contamination from residual oils contained in the oil dehydrator.

SUMMARY

An object of the present disclosure is to provide an oil dehydrator, a system for dehydrating oil comprising an oil dehydrator and a method for dehydrating oil with an oil dehydrator, where the previously mentioned problems are avoided. This object is at least partly achieved by the features of the independent claims. The dependent claims contain further developments of the oil dehydrator, the system for dehydrating oil comprising an oil dehydrator and the method for dehydrating oil with an oil dehydrator.

The disclosure concerns an oil dehydrator, comprising; a vacuum chamber, a vacuum pump arranged at an upper end region of the vacuum chamber for establishing a negative pressure within the vacuum chamber and for fluid transportation of water and air out from the vacuum chamber through an outlet opening, and a pipe for fluid transportation of oil into and/or out from the vacuum chamber. The pipe is connected to a lower end region of the vacuum chamber, wherein the vacuum chamber at the lower end region has at least one flow channel fluidly connecting the vacuum chamber and the pipe. An orifice check valve is arranged between the vacuum chamber and the pipe for controlling the flow of oil into and out from the vacuum chamber through the at least one flow channel. Advantages with these features are that the oil dehydrator is constructed in a way that makes it easy and flexible to use also in explosion proof areas, since no electrical components are present in the design. Further, the oil dehydrator is lightweight in construction with few components, which makes it simple to produce at a cost that is much lower than the cost of traditional oil dehydrators. The oil dehydrator may with this construction be designed as a portable unit that is easy to move from one oil reservoir to another, so that one person easily can lift and carry the oil dehydrator. The construction also gives the possibility to design the oil dehydrator as a stationary unit for a specific oil reservoir, such as an oil reservoir in a pump system. The orifice check valve efficiently controls the flow of oil into and out from the vacuum chamber and has a design that supports the compact and lightweight construction of the oil dehydrator. The orifice check valve secures that the oil is emptied from the vacuum chamber so that the oil dehydrator is possible to use in systems with different oils without contamination from oil residues contained in the oil dehydrator.

According to an aspect of the disclosure, the orifice check valve is configured to switch an operational state between an open mode allowing oil to flow out from the vacuum chamber, and a closed mode, wherein the orifice check valve is controlling the flow of oil through the at least one flow channel into the vacuum chamber so that the flow area in the closed mode is lower than the flow area in the open mode. The orifice check valve thus regulates the flow of oil through the at least one flow channel, with a larger flow area when emptying the vacuum chamber for an efficient flow of oil out from the vacuum chamber.

According to another aspect of the disclosure, the vacuum chamber has at least one inlet flow channel at the lower end region, and at least one outlet flow channel at the lower end region, where the at least one outlet flow channel is separately arranged from the at least one inlet flow channel. In this way the flow of oil into and out from the vacuum chamber can be controlled in an efficient way with different flow channels.

According to a further aspect of the disclosure, the vacuum pump is a vacuum ejector pump. Advantages with this pump type are that the vacuum ejector pump is simple in construction and that no electrical components are involved in the construction, which makes the oil dehydrator possible to use also in explosion proof areas.

According to another aspect of the disclosure, the vacuum pump is connected to a timer valve, which is controlling a flow of compressed air through the vacuum ejector pump. The timer valve is configured to switch an operational state between an open mode allowing compressed air to flow through the vacuum ejector pump, and a closed mode preventing compressed air to flow through the vacuum ejector pump. The timer valve controls the oil dehydration process through the steering of compressed air to the vacuum ejector pump.

According to another aspect of the disclosure, the orifice check valve comprises a valve plate with at least one orifice, where the valve plate is arranged for controlling the flow of oil out from the vacuum chamber through the at least one flow channel, allowing oil to flow into the at least one flow channel through the at least one orifice, when the orifice check valve is in its closed mode. In this way a negative pressure can be efficiently established within the vacuum chamber when drawing oil into the chamber through the at least one orifice in the valve plate.

According to a further aspect of the disclosure, an inner tube is arranged inside the vacuum chamber, where the inner tube has a lower tube end that is in fluid communication with the at least one flow channel, and an upper tube end provided with at least one spray nozzle, where the spray nozzle is arranged for spraying oil into the vacuum chamber. The inner tube and the spray nozzle provide an efficient distribution of oil in the vacuum chamber, allowing oil to flow from the upper end region of the vacuum chamber so that an efficient evaporation of the water is achieved.

According to other aspects of the disclosure, the vacuum chamber is filled with a filler material that is increasing the contact surface area between the oil and the air in the vacuum chamber, where the filler material can be a random packing material. The filler material increases the contact surface between the oil and the air to further increase the evaporation rate of the water in the oil. A random packing material is providing an efficient surface structure within the vacuum chamber.

According to another aspect of the disclosure, a first air inlet opening is arranged in the lower end region of the vacuum chamber, where the first air inlet opening allows air to flow into the vacuum chamber. Through the flow of air into the chamber, the evaporation process can be made more efficient since the oil is mixing with incoming air.

According to another aspect of the disclosure, a float valve is arranged inside the vacuum chamber at the upper end region for controlling the fluid transportation of water and air out from the vacuum chamber through the outlet opening. The float valve is configured to switch an operational state between an open mode allowing water and air to flow out from the vacuum chamber through the outlet opening, and a closed mode preventing water and air to flow out from the vacuum chamber through the outlet opening. The float valve secures that the oil cannot leak out from the upper part of the vacuum chamber, which is important to prevent oil contamination of the surrounding environment. The float valve is simple in construction, which makes it simple to produce at a low cost.

According to a further aspect of the disclosure, an oil filter is arranged inside the vacuum chamber after the at least one inlet flow channel. The oil filter is cleaning the oil so that unwanted particles or other contaminations can be removed from the oil.

According to another aspect of the disclosure, a second air inlet opening is arranged at the upper end region of the vacuum chamber, where the second air inlet opening allows compressed air to flow into the vacuum chamber via a preloaded check valve, where the preloaded check valve is configured to switch an operational state between an open mode allowing compressed air to flow into the vacuum chamber through the second air inlet opening, and a closed mode preventing compressed air to flow into the vacuum chamber through the second air inlet opening. In this way the vacuum chamber can be emptied in a fast way by the compressed air that is forcing the oil to flow out from the vacuum chamber.

The disclosure further concerns a system for dehydrating oil comprising an oil dehydrator, wherein the system comprises an oil reservoir and a compressed air source. The system can also comprise an oil separating unit.

The disclosure further concerns a method for dehydrating oil with an oil dehydrator. A negative pressure is applied to the vacuum chamber with the vacuum pump and the operational state of the orifice check valve is switched to a closed mode, in which oil is prevented from flowing out from the vacuum chamber. Oil is drawn into the vacuum chamber from an oil reservoir through the pipe and the at least one flow channel, and water and air are transported out from the vacuum chamber with the vacuum pump through the outlet opening. The applying of the negative pressure to the vacuum chamber with the vacuum pump is stopped and the operational state of the orifice check valve is switched to an open mode, wherein oil is flowing out from the vacuum chamber through the at least one flow channel. Advantages with these features are that the oil dehydrator is operated in a way for an efficient dehydration of the oil. The oil dehydrator is operated in cycles and a number of cycles may be processed after each other so that a continuous process is achieved and an efficient dehydration of the oil is accomplished.

According to another aspect of the disclosure, the orifice check valve is switching the operational state to the closed mode by the flow of oil drawn into the vacuum chamber when the negative pressure is applied to the vacuum chamber; and wherein the orifice check valve is switching the operational state to the open mode by the flow of oil out from the vacuum chamber when the negative pressure is no longer applied to the vacuum chamber. In this way the orifice check valve is self-operating without the need for separate valve control means. The flow of oil into and out from the vacuum chamber is regulating the valve.

According to another aspect of the disclosure, an inner tube is arranged inside the vacuum chamber. The inner tube has a lower tube end that is in fluid communication with the at least one flow channel, and an upper tube end provided with at least one spray nozzle, wherein the spray nozzle is spraying oil into the upper end region of the vacuum chamber when the vacuum pump is applying a negative pressure to the vacuum chamber and the orifice check valve is in the closed mode. The inner tube and the spray nozzle provide an efficient distribution of oil in the vacuum chamber, allowing oil to flow from the upper end region of the vacuum chamber so that an efficient evaporation of the water is achieved.

According to a further aspect of the disclosure, air is flowing into the vacuum chamber through a first air inlet opening arranged in the lower end region of the vacuum chamber when the vacuum pump is applying a negative pressure to the vacuum chamber and the orifice check valve is in the closed mode. Through the flow of air into the chamber, the evaporation process can be made more efficient since the oil is mixing with incoming air.

According to another aspect of the disclosure, a flow of compressed air is applied to the vacuum chamber via a preloaded check valve and a second air inlet opening arranged at the upper end region of the vacuum chamber, when the negative pressure is no longer applied to the vacuum chamber, so that oil is forced to flow out from the vacuum chamber through the at least one flow channel. In this way the vacuum chamber can be emptied in a fast way by the compressed air that is forcing the oil to flow out from the vacuum chamber.

BRIEF DESCRIPTION OF DRAWINGS

The disclosure will be described in greater detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
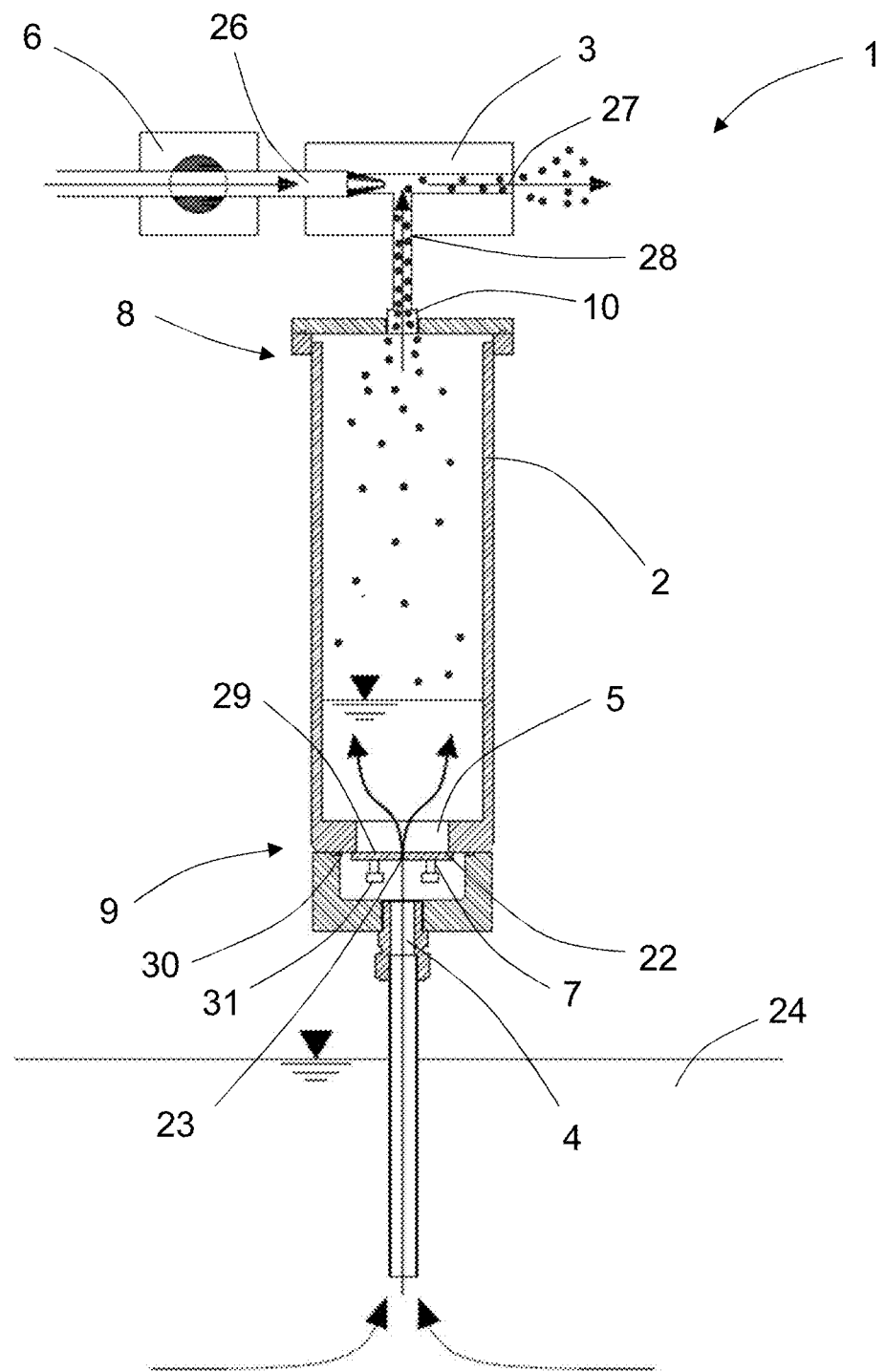
FIG. 1a-d show schematically, cross-sections of an oil dehydrator and a schematic view of the oil dehydrator according to the disclosure.
Figure 1B:
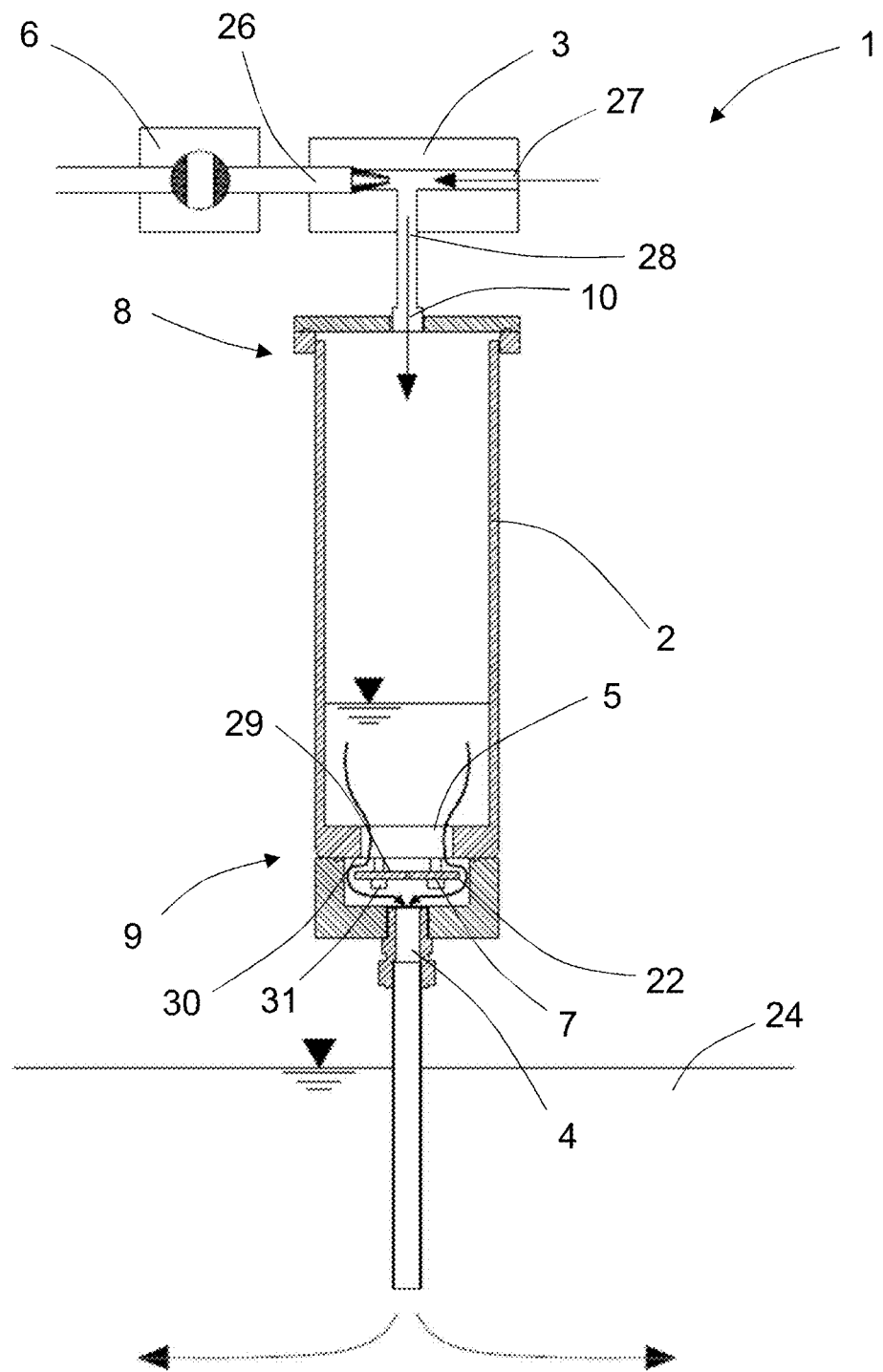

FIGS. 1a and 1b schematically show cross-sections of an oil dehydrator 1 according to the disclosure, comprising a vacuum chamber 2. FIG. 1d shows a schematic view of the oil dehydrator in FIGS. 1a and 1b. The vacuum chamber 2 may have an essentially cylindrical shape with an upper end region 8 and a lower end region 9, where the upper end region 8 is arranged above the lower end region 9 during use of the oil dehydrator 1. The vacuum chamber 2 may have other suitable shapes than cylindrical, depending on the design of the oil dehydrator 1. The vacuum chamber 2 may be made from a suitable steel material, such as stainless steel, or from other suitable materials, for example aluminium, plastic materials or composite materials. The size of the vacuum chamber 2 may vary depending on the design of the oil dehydrator 1. It is possible to construct the oil dehydrator 1 with a very compact design as a portable unit, but larger constructions are also an option. As a non-limiting example, for a compact portable type of oil dehydrator 1 the vacuum chamber 2 is made from a stainless steel cylinder with an inner diameter of 100-150 mm with a length of the cylinder of 300-400 mm, but other dimensions may be used depending on the design of the oil dehydrator.

The vacuum chamber 2 is constructed as a liquid and gas tight container with at least one flow channel 5 and at least one outlet opening 10. In the embodiment shown in FIGS. 1a and 1b, the vacuum chamber has one flow channel 5 and one outlet opening 10.

A vacuum pump 3 is arranged at the upper end region 8 of the vacuum chamber 2 for establishing a negative pressure within the vacuum chamber 2 and for fluid transportation of water and air out from the vacuum chamber 2 through the outlet opening 10. The term negative pressure refers to the situation in which an enclosed volume has a lower pressure than the surroundings. The vacuum pump 3 establishes a pressure within the vacuum chamber 2 that is lower than the surrounding air pressure.

The vacuum pump, shown in FIGS. 1a, 1b and 1d is of the vacuum ejector pump type, using the known venturi effect of a converging-diverging nozzle to convert the pressure energy of a motive fluid to velocity energy, which creates a low pressure zone that draws in and entrains a suction fluid. The vacuum ejector pump 3 has a pump inlet opening 26 and a pump outlet opening 27 for compressed air from a compressed air source 25 and a suction inlet opening 28 for the removal of water and air from the vacuum chamber 2 through the outlet opening 10. The compressed air may for example have a pressure between 4-6 bar, corresponding to 400-600 kPa, as commonly used within the industry. Instead of a vacuum ejector pump, an alternative type of vacuum pump may be used.

The oil dehydrator 1 further comprises a pipe 4 for fluid transportation of oil into the vacuum chamber 2 from an oil reservoir 24 and/or out from the vacuum chamber 2. In the embodiment shown in FIGS. 1a and 1b, the oil dehydrator has one and the same pipe 4 for fluid transportation of oil into and out from the vacuum chamber 2, where the pipe 4 is connected to the lower end region 9 of the vacuum chamber 2 via pipe attachment means. As an alternative, two or more pipes may instead be used for the transportation of oil into and out from the vacuum chamber, where it also may be possible to have at least one separate pipe for transportation of oil into the vacuum chamber 2 and at least one separate pipe for transportation of oil out from the vacuum chamber 2. The pipe 4 may be made of any suitable material as for example stainless steel, aluminium or other metallic materials. As an alternative, the pipe 4 may be made of a suitable plastic material, a composite material or from a flexible pipe material, such as flexible plastic materials or rubber. The length and the inner diameter of the pipe 4 may be chosen so that the oil dehydrator works in an efficient way, which for example depends on the type of oil that is dehydrated, the size of the vacuum chamber 2 and the type of vacuum pump 3 used. As a non-limiting example, the pipe 4 may have an inner diameter of 15-45 mm for a smaller type of portable oil dehydrator 1, but other dimensions may also be used depending on the design of the oil dehydrator 1. As shown in FIGS. 1a and 1b, the flow channel 5 is arranged at the lower end region 9 of the vacuum chamber 2, and is fluidly connecting the vacuum chamber 2 and the pipe 4 so that oil can be drawn into the vacuum chamber 2 through the pipe 4 and evacuated from the vacuum chamber 2 through the pipe 4.

A valve is arranged between the vacuum chamber 2 and the pipe 4 for controlling the flow of oil out from and into the vacuum chamber 2 through the flow channel 5. With this design, one and the same valve can be used for controlling the flow of oil both into and out from the vacuum chamber 2. The specific valve type used to control the flow of oil is an orifice check valve 7 that permits full flow of fluid in one direction and restricts the flow of fluid in the other direction. The orifice check valve 7 can be made small so that the oil dehydrator 1 can be of a lightweight and compact construction with only one valve controlling the flow of oil into and out from the vacuum chamber 2, giving the oil dehydrator a simple and efficient design. The orifice check valve 7 is configured to switch an operational state between an open mode and a closed mode. The orifice check valve 7 comprises a valve plate 22, which in the closed mode is arranged for preventing flow of oil out from the vacuum chamber 2 through the flow channel 5, and at the same time arranged for controlling the flow of oil into the vacuum chamber 2 as will be further described below. In FIG. 1a, the orifice check valve 7 is in its closed mode, where an upper surface 29 of the valve plate 22 is in contact with a lower surface 30 of the vacuum chamber 2, arranged in the lower end region 9. In the closed mode, a tight seal is established between the upper surface 29 of the valve plate 22 and the lower surface 30 of the vacuum chamber 2.

In the embodiment shown in FIG. 1a, the valve plate 22 is provided with an orifice 23, through which oil can be drawn into the vacuum chamber 2 in the closed mode, when the pump 3 is applying a negative pressure to the vacuum chamber 2. The orifice 23 has a fixed area and the orifice 23 can be made of a suitably sized hole that is drilled in the valve plate. As an alternative, instead of one orifice 23, the valve plate 22 may be provided with two or more orifices, through which oil can be drawn into the vacuum chamber 2 in the closed mode. In the open mode, as can be seen in FIG. 1b, the upper surface 29 of the valve plate 22 is no longer in contact with the lower surface 30 of the vacuum chamber 2, and oil that has been drawn into the vacuum chamber 2 is allowed to flow out from the vacuum chamber 2 when the negative pressure is no longer applied to the vacuum chamber 2. By opening the orifice check valve 7, the vacuum chamber 2 can be emptied with a high flow of oil through the flow channel 5. The orifice check valve 7 is thus controlling the flow of oil through the flow channel 5 so that the flow area in the closed mode is lower than the flow area in the open mode. In the open mode, a small amount of oil may also flow out from the vacuum chamber 2 through the orifice 23 of the valve plate 22.

The orifice check valve 7 may be designed so that it is switching the operational state to the closed mode by the flow of oil drawn into the vacuum chamber 2 when the negative pressure is applied to the vacuum chamber 2. When oil is drawn into the pipe 4 and reaches the valve plate, which then is in the open mode, the flow of oil is pushing the upper surface 29 of the valve plate 22 in a direction upwards, towards the lower surface 30 of the vacuum chamber 2 so that the orifice check valve 7 closes. Since the orifice check valve 7 now is in the closed mode, oil is drawn into the vacuum chamber 2 through the orifice 23. When the negative pressure is no longer applied to the vacuum chamber 2, the oil in the vacuum chamber 2 will apply a pressure in a direction downwards on the valve plate 22 due to gravitational forces, which forces will push the valve plate 22 downwards into the open mode. In this way, the orifice check valve 7 is switching the operational state to the open mode by the flow of oil out from the vacuum chamber 2.

The orifice check valve 7 is thus used in the liquid system to allow full flow of oil out from the vacuum chamber 2 when the orifice check valve 7 is in the open mode, and to allow a restricted flow of oil into the vacuum chamber 2 through the orifice 23 in the closed mode. The orifice check valve 7 has in the disclosed embodiment a fixed orifice area chosen to fit the specific design of the oil dehydrator, but may possibly also have a variable orifice area so that the flow of oil into the vacuum chamber 2 may be varied depending on the design of the oil dehydrator 1 and the type of oil that is dehydrated.

The valve plate 22 can be connected to the lower surface 30 of the vacuum chamber 2 with valve bolts 31 or similar devices, where the valve plate 22 is provided with openings for engagement with the valve bolts 31. The valve plate can be displaced along the valve bolts 31 between an upper position in the closed mode and a lower position in the open mode. The valve plate may be made of a suitable lightweight plastic material, such as polyamide (PA), that is easily impacted by the flow of oil so that the valve plate can change between the upper and lower positions depending on the oil flow direction.

Other suitable plastic materials for the valve plate 22 are for example polyoxymethylene (POM) and polyether-etherketone (PEEK). Also, composite materials or metals may be used.

In FIGS. 1a and 1b, the vacuum pump 3 is connected to a timer valve 6, which is controlling the flow of compressed air through the vacuum ejector pump. The timer valve 6 is configured to switch an operational state between an open mode allowing compressed air to flow through the vacuum ejector pump 3, and a closed mode preventing compressed air to flow through the vacuum ejector pump 3. When compressed air is flowing through the vacuum ejector pump 3, the negative pressure is applied to the vacuum chamber 2 and when the flow of compressed air through the vacuum ejector pump is stopped by the timer valve 6, the negative pressure is no longer applied to the vacuum chamber 2.

When starting the oil dehydration process, the oil dehydrator 1 is empty so that only air is contained within the vacuum chamber 2. The timer valve 6 is switched to an open mode allowing compressed air to flow through the vacuum ejector pump 3. A negative pressure is then applied to the vacuum chamber 2 with the vacuum ejector pump 3 so that oil is drawn from the oil reservoir 24 into the pipe 4. The operational state of the orifice check valve 7 is switched to a closed mode, as shown in FIG. 1*a*, by the flow of oil impacting the valve plate 22. By the negative pressure applied with the vacuum ejector pump 3, oil is drawn into the vacuum chamber 2 from the oil reservoir 24 through the pipe 4, the orifice 23 in the valve plate 22 and the flow channel 5. Since the vacuum ejector pump 3 is applying a negative pressure to the vacuum chamber and since the orifice 23 in the valve plate 22 has a small flow area, a negative pressure low enough for causing the water in the oil to evaporate through vacuum evaporation is achieved. The orifice 23 in the valve plate 22 is designed with a much smaller flow area than the flow opening 5, and in the closed mode the valve plate 22 is blocking the larger flow area of the flow channel 5.

Vacuum evaporation is the process of causing the pressure in a liquid-filled container to be reduced below the vapour pressure of the liquid, which is causing the liquid to evaporate at a lower temperature than normal. The oil dehydrator 1 uses this process to evaporate water contained in the oil by lowering the pressure in the vacuum chamber 2 below the standard atmospheric pressure.

If the pressure is lowered in the vacuum chamber 2 to a level where the water in the oil starts to boil, there is a risk that the boiling water together with the oil is creating an oil foam that will flood the vacuum chamber 2 and the oil foam may be evacuated from the vacuum chamber 2 through the outlet opening 10 into the vacuum ejector pump 3, which is not the most optimal process, since the oil foam may contaminate the environment outside the oil dehydrator 1. If using a pressure level where the water is boiling, a suitable oil separator may be used after the vacuum ejector pump 3 so that the oil in the oil foam that may be drawn out from the vacuum chamber can be separated from the air and water. To have a more controlled evaporation, the pressure instead may be lowered to a point slightly above the point where the water starts to boil. The evaporation rate will be high enough for efficient dehydration of the oil and the oil foam creation will not occur. As a non-limiting example, a suitable negative pressure level for a synthetic ester oil, such as Castrol® BioBar 46, may for example be −0.9 bar, or −90 kPa, below atmospheric pressure when the oil has a temperature of 40 degrees.

The evaporated water will be transported out from the vacuum chamber 2 with the vacuum ejector pump 3 through the outlet opening 10 into the suction inlet opening 28 of the vacuum ejector pump 3, and out from the vacuum ejector pump 3 through the pump outlet opening 27, together with the air contained in the vacuum chamber 2.

After a first time period, when the vacuum chamber 2 has been filled with a certain volume of oil, during which first time period the negative pressure has been applied to the vacuum chamber by the vacuum ejector pump 3, the timer valve 6 is switched to a closed mode preventing compressed air to flow through the vacuum ejector pump 3. Since the negative pressure is no longer applied to the vacuum chamber, the operational state of the orifice check valve 7 is switched from the closed mode to the open mode, as shown in FIG. 1*b*, by the gravitational forces of the oil contained in the vacuum chamber 2. The oil is then allowed to flow out from the vacuum chamber 2 through the flow channel 5 and the pipe 4 back into the oil reservoir 24. When the oil is flowing out from the vacuum chamber 2, surrounding air is allowed to flow back into the vacuum chamber 2 through the pump outlet opening 27 and the suction inlet opening 28 of the vacuum ejector pump 3 and the outlet opening 10 of the vacuum chamber 2. When the vacuum chamber 2 has been emptied after a second time period, during which second time period no negative pressure has been applied to the vacuum chamber 2 by the vacuum ejector pump 3, the timer valve 6 may again be switched to an open mode allowing compressed air to flow through the vacuum ejector pump 3 so that the operational process of the oil dehydrator 1 may start again.

The oil dehydrator is operated in cycles with the first and second time periods as described above, where the vacuum chamber 2 is filled with oil during the first time period and then emptied during the second time period. A number of cycles may be processed after each other so that a continuous process is achieved and an efficient dehydration of the oil is accomplished. The duration of the time periods can be adjusted depending for example on the type of oil that is dehydrated and the size of the vacuum chamber 2, so than an efficient dehydration is achieved. As a non-limiting example, the first time period may last between 10-40 seconds and the second time period may last between 5-10 seconds. Other time periods may also be chosen depending on the design of the oil dehydrator 1 and the type of oil. The first time period should be chosen so that the vacuum chamber is not overfilled with oil, which for example can depend on the negative pressure applied to the vacuum chamber 2, the size of the orifice 23 and the viscosity of the oil. The second time period should be chosen so that the vacuum chamber 2 is thoroughly emptied. As an alternative, the oil in the oil reservoir 24 may be heated by an oil heating means so that a more efficient evaporation is achieved in the vacuum chamber 2.

The oil dehydrator 1 may with this construction with the orifice check valve 7 be designed as a portable unit that is possible to move from one oil reservoir 24 to another. The oil dehydrator 1 can for example be made as a handheld unit, which the operator of the oil dehydrator 1 easily can lift and carry. The oil dehydrator 1 may also be designed as a stationary unit for a specific oil reservoir 24, such as for example an oil reservoir in a pump system. The orifice check valve 7 efficiently controls the flow of oil into and out from the vacuum chamber 2 and has a design that supports a compact and lightweight construction of the oil dehydrator 1.

Figure 1C:
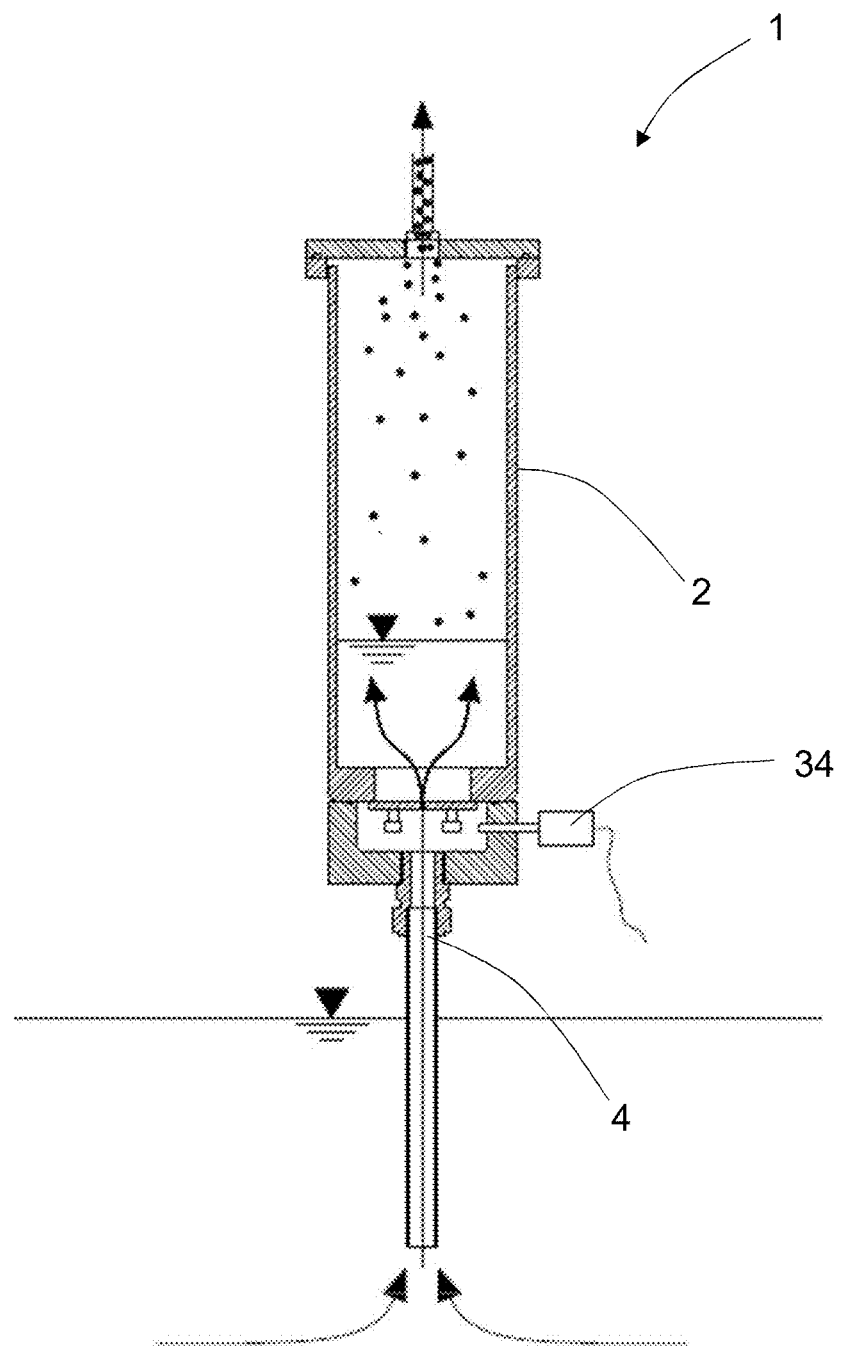
Figure 1D:
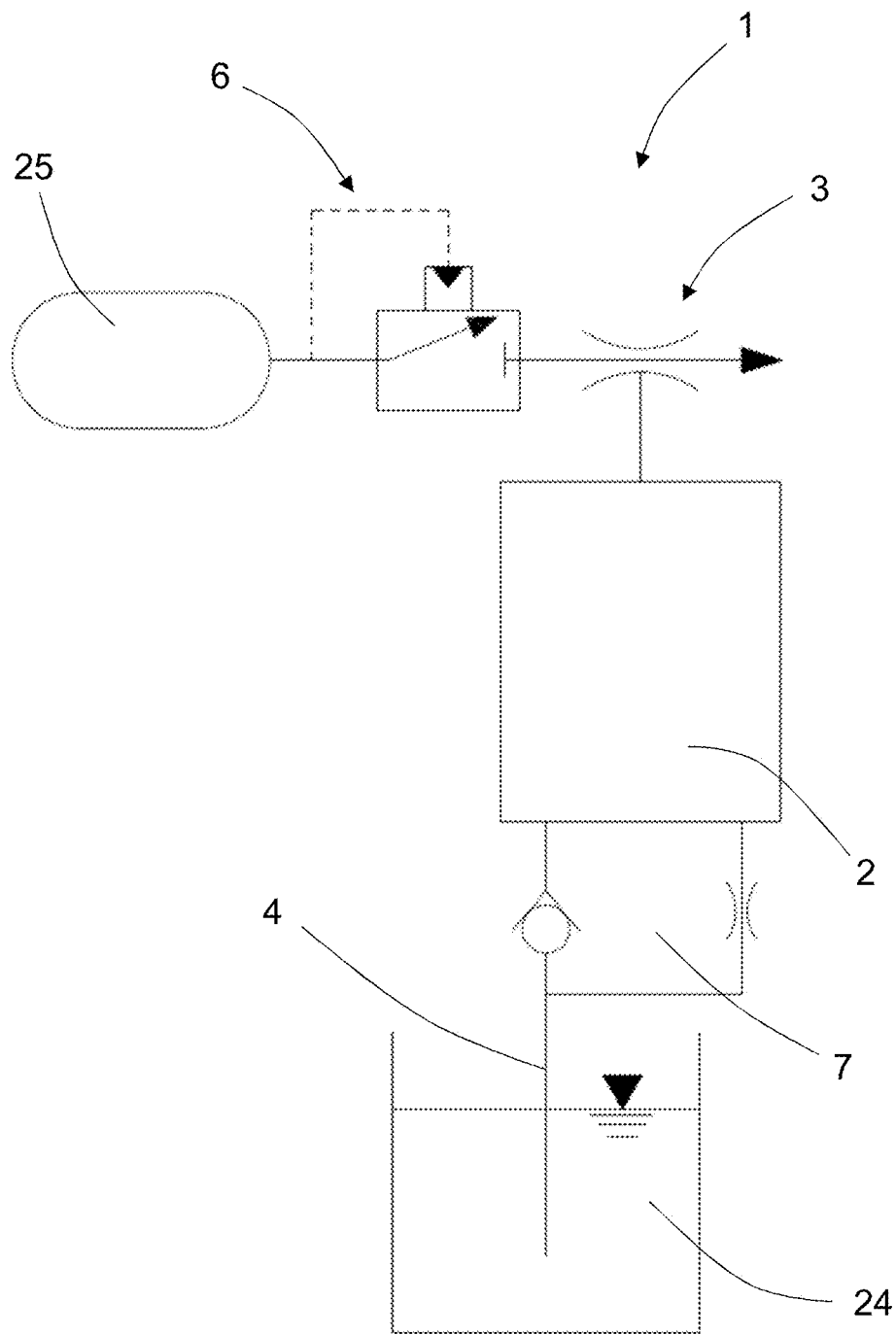

In FIG. 1*c*, the oil dehydrator 1 is shown with a moisture sensor 34 applied to the part of the oil dehydrator 1 where the pipe 4 is attached. The moisture sensor 34 can be used to measure the amount of water in the oil, both for oil that is drawn into the vacuum chamber 2 and for oil flowing out from the vacuum chamber. The moisture sensor 34 may also be arranged at other suitable locations within the oil dehydrator depending on the design.

Figure 2:
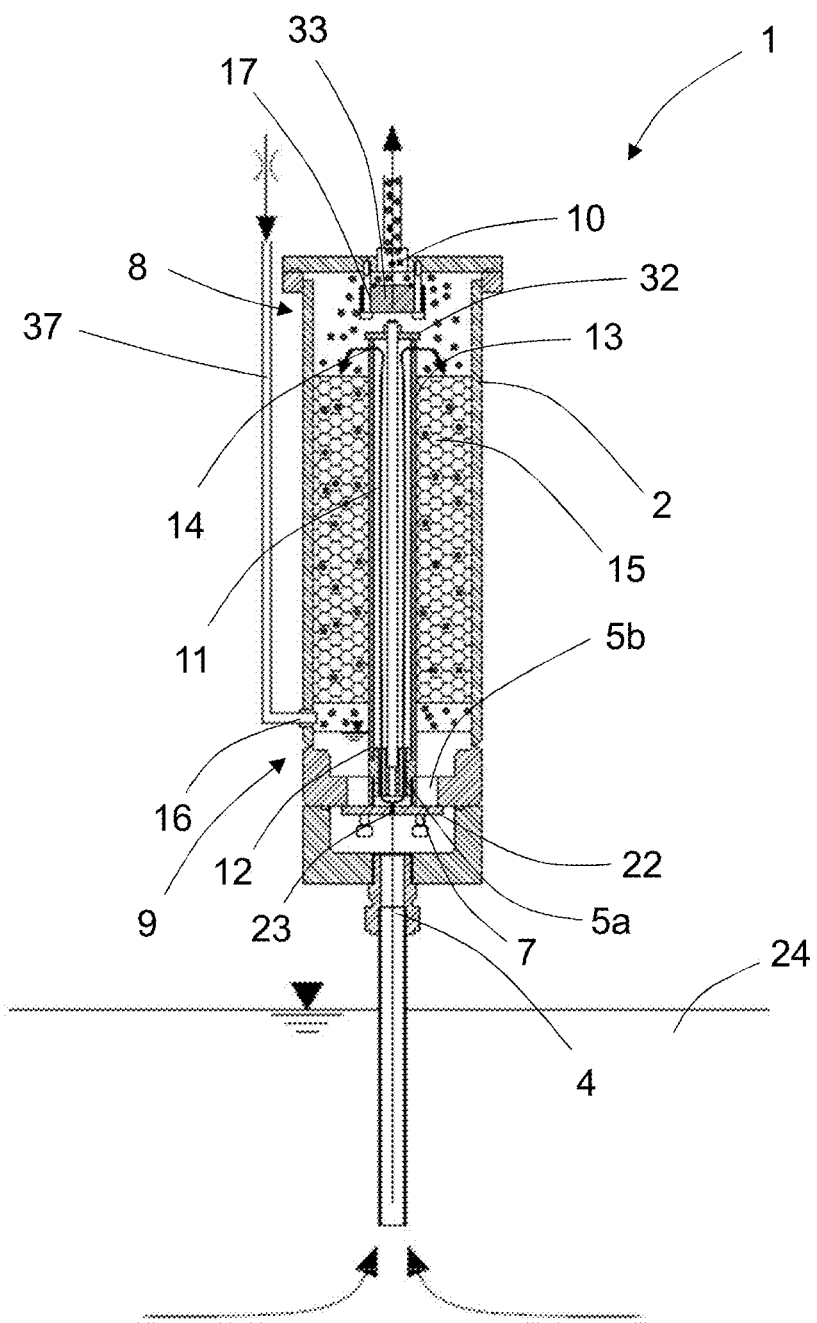
FIG. 2 shows schematically, a cross-section of an oil dehydrator according to another embodiment of the disclosure.

In FIG. 2, another embodiment of the oil dehydrator 1 is shown, where an inner tube 11 is arranged inside the vacuum chamber 2. The inner tube 11 has a lower tube end 12 that is in fluid communication with at least one inlet flow channel 5a. The inner tube 11 further has an upper tube end 13 provided with at least one spray nozzle 14, where the at least one spray nozzle 14 is arranged for spraying oil into the vacuum chamber 2. The at least one spray nozzle 14 may be arranged as one or more holes, slots or shaped apertures arranged in the side wall of the inner tube 11 at the upper tube end 13. An end cap 32 is preventing oil to flow over the edge of the inner tube 11 at the upper tube end 13. Other types of spray nozzle arrangements are also possible.

The oil dehydrator 1 in the embodiment shown in FIG. 2, operates in a similar way as described in the embodiment shown in FIGS. 1a and 1b. Negative pressure is applied to the vacuum chamber 2 with a vacuum ejector pump, which is controlled by a timer valve in the same way as described above. The vacuum ejector pump and the timer valve are not shown in FIG. 2.

The oil dehydrator is in FIG. 2 shown with the orifice check valve 7 in the closed mode. The orifice check valve 7 is of the same construction as described above in the first embodiment of the oil dehydrator 1, with an orifice 23 having a fixed area arranged in the valve plate 22. In the closed mode, the upper surface of the valve plate 22 is in contact with the lower surface of the vacuum chamber 2. Oil can in the closed mode be drawn into the vacuum chamber 2 via the orifice 23 and the at least one inlet flow channel 5a, when the vacuum pump is applying a negative pressure to the vacuum chamber 2. In the open mode, not shown in FIG. 2, the upper surface of the valve plate 22 is no longer in contact with the lower surface of the vacuum chamber 2, and oil that has been drawn into the vacuum chamber 2 is allowed to flow out from the vacuum chamber 2 through at least one outlet flow channel 5b, when the negative pressure is no longer applied to the vacuum chamber 2.

The at least one inlet flow channel 5a and the at least one outlet flow channel 5b are arranged in the lower end region 9 of the vacuum chamber 2. The at least one outlet flow channel 5b is separated from the at least one inlet flow channel 5a, so that the main part of the flow of oil out from the vacuum chamber 2 flows through the at least one outlet flow channel 5b. In the closed mode, the orifice check valve 7 is blocking the flow of oil through the at least one outlet flow channel 5b.

The vacuum chamber 2 may be filled with a filler material 15 that is increasing the contact surface area between the oil and the air in the vacuum chamber 2. The use of the filler material 15 will increase the evaporation rate of the water in the oil. The filler material 15 may be a random packing material, such as for example Raschig rings that provide a large surface area within the vacuum chamber 2 for interaction between the oil and air during the dehydration process. Other suitable packing materials that are increasing the contact surface area may also be used. To further increase the interaction between oil and air, a first air inlet opening 16 is arranged in the lower end region 9 of the vacuum chamber 2. The first air inlet opening 16 is as shown in FIG. 2, connected to a hose 37 or pipe so that oil is prevented from flowing out to the surrounding environment. Ambient air is drawn into the vacuum chamber 2 via the hose 37 and the first air inlet opening 16 when the negative pressure is applied to the vacuum chamber 2. The flow area of the first air inlet opening 16 is small so that sufficient negative pressure in the vacuum chamber is possible to achieve for efficient evaporation, and the flow area of the first air inlet opening 16 has thus a restricted flow of air into the vacuum chamber. The first air inlet opening 16 in the embodiment shown has a fixed inlet flow area that is chosen to fit the specific design of the oil dehydrator 1, but as an alternative the first air inlet opening 16 may have a flow area that can be varied by a valve or similar arrangement so that the flow of air into the vacuum chamber may be possible to control. The first air inlet opening 16 allows air to flow into the vacuum chamber 2 from the lower end region 9, through the filler material 15 and out through the outlet opening 10. When oil is sprayed into the vacuum chamber 2 from the spray nozzles 14, the oil is flowing downwards through the filler material 15. The flow of air from the first air inlet opening 16 meets the flow of oil in the filler material 15 and an efficient evaporation of the water in the oil is achieved.

The oil dehydrator comprises a float valve 17, which is arranged inside the vacuum chamber 2 at the upper end region 8 for controlling the fluid transportation of water and air out from the vacuum chamber 2 through the outlet opening 10. The float valve 17 is a security valve that is preventing oil to flow out from the vacuum chamber 2 through the outlet opening 10, in case the oil in the vacuum chamber 2 reaches a too high level. The float valve 17 is configured to switch an operational state between an open mode allowing water and air to flow out from the vacuum chamber 2 through the outlet opening 10, and a closed mode preventing water and air to flow out from the vacuum chamber 2 through the outlet opening 10.

The float valve 17 is designed with a floating valve element 33, which is blocking the outlet opening 10 when the oil in the vacuum chamber reaches a level, where the floating valve element 33 is impacted by the oil in the vacuum chamber. The float valve 17 is simple in construction and when the oil level in the vacuum chamber is low, the floating valve element 33 is in a lower position, shown in FIG. 2, where water and air can be transported out from the vacuum chamber 2 through the outlet opening 10. When the oil reaches a level where the floating element 33 starts to float in the oil, the floating valve element 33 is moving upwards with the increasing oil level until the upper surface of the floating valve element 33 is blocking the outlet opening 10 so that oil is prevented from flowing out through the outlet opening 10.

When starting the oil dehydration process, the oil dehydrator 1 is empty so that only air is contained within the vacuum chamber 2. The timer valve 6 is switched to an open mode allowing compressed air to flow through the vacuum ejector pump. A negative pressure is then applied to the vacuum chamber 2 with the vacuum ejector pump so that oil is drawn from an oil reservoir 24 into the pipe 4. The operational state of the orifice check valve 7 is switched from an open mode to a closed mode by the flow of oil impacting the valve plate 22. By the negative pressure applied with the vacuum ejector pump, oil is sprayed into the upper end region 8 of the vacuum chamber 2 from the oil reservoir 24 through the pipe 4, the orifice 23 in the valve plate 22, the inlet flow channel 5a, the inner tube 11, and the spray nozzles 14. Air is flowing into the vacuum chamber 2 through the first air inlet opening 16, through the filler material 15 and out through the outlet opening 10. When oil is sprayed into the vacuum chamber 2 from the spray nozzles 14, the oil is flowing downwards through the filler material 15. The flow of air from the first air inlet opening 16 meets the flow of oil in the filler material 15 and an efficient evaporation of the water in the oil is achieved.

The evaporated water will be transported out from the vacuum chamber 2 with the vacuum ejector pump through the outlet opening 10 into the suction inlet opening of the vacuum ejector pump, and out from the vacuum ejector pump through the pump outlet opening, together with the air contained in the vacuum chamber 2.

After a first time period, when the vacuum chamber 2 has been filled with a certain volume of oil, during which first time period the negative pressure has been applied to the vacuum chamber by the vacuum ejector pump, the timer valve 6 is switched to a closed mode preventing compressed air to flow through the vacuum ejector pump. Since the negative pressure is no longer applied to the vacuum chamber, the operational state of the orifice check valve 7 is switched to an open mode by the gravitational forces of the oil contained in the vacuum chamber 2. The oil is then allowed to flow out from the vacuum chamber 2 through the outlet flow channel 5b and the pipe 4 back into the oil reservoir 24. When the vacuum chamber 2 has been emptied after a second time period, during which second time period no negative pressure has been applied to the vacuum chamber 2 by the vacuum ejector pump, the timer valve 6 may again be switched to an open mode allowing compressed air to flow through the vacuum ejector pump so that the operational process of the oil dehydrator 1 may start again.

The oil dehydrator is operated in cycles with the first and second time periods as described above, where the vacuum chamber 2 is filled with oil during the first time period and then emptied during the second time period. A number of cycles may be processed after each other so that a continuous process is achieved and an efficient dehydration of the oil is accomplished.

Figure 3:
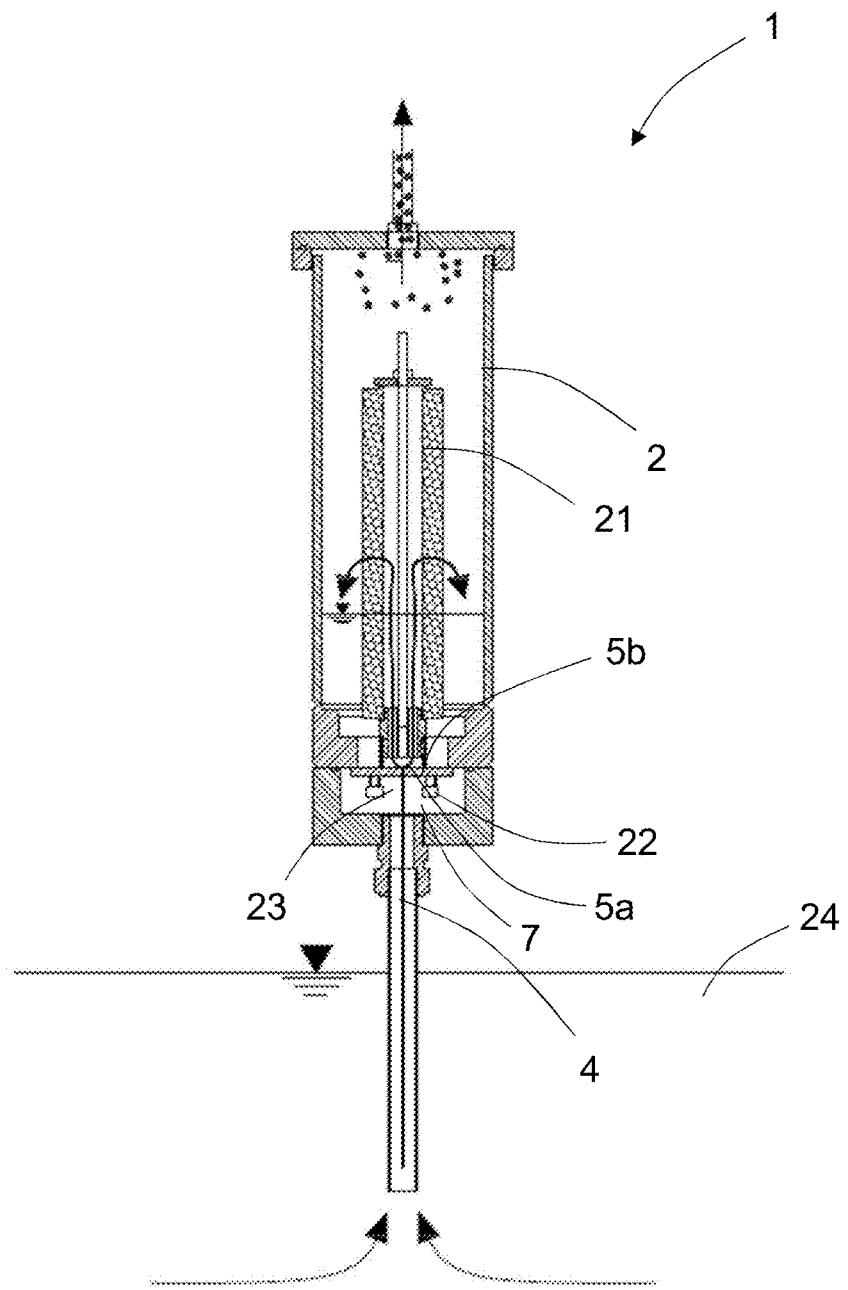
FIG. 3 shows schematically, a cross-section of an oil dehydrator according to another embodiment of the disclosure.

In FIG. 3, another alternative embodiment of the oil dehydrator 1 is shown, where an oil filter 21 is arranged inside the vacuum chamber 2 after the at least one inlet flow channel 5a. An orifice check valve 7 comprises a valve plate 22 and an orifice 23, and operates in the same way as described in the embodiments above. When a negative pressure is applied to the vacuum chamber 2 with the vacuum ejector pump and the orifice check valve 7 is in the closed mode, oil is drawn into the vacuum chamber 2 through a pipe 4, the orifice 23 and at least one inlet flow channel 5a. The oil flows into the vacuum chamber 2 through the structure of the oil filter 21 so that the oil that is entering the vacuum chamber 2 is filtered. Any suitable type of oil filter structures may be used for filtering the oil. The filtered oil is after dehydration allowed to flow out from the vacuum chamber 2 through at least one outlet flow opening 5b when the negative pressure is no longer applied and the orifice check valve 7 is in the open mode. As an alternative, the oil filter may instead be arranged at the inlet opening of the pipe 4 in the oil reservoir 24 or below the orifice check valve 7 above the pipe 4. Other arrangements of the oil filter are also possible depending on the design of the oil dehydrator 1.

Figure 4:
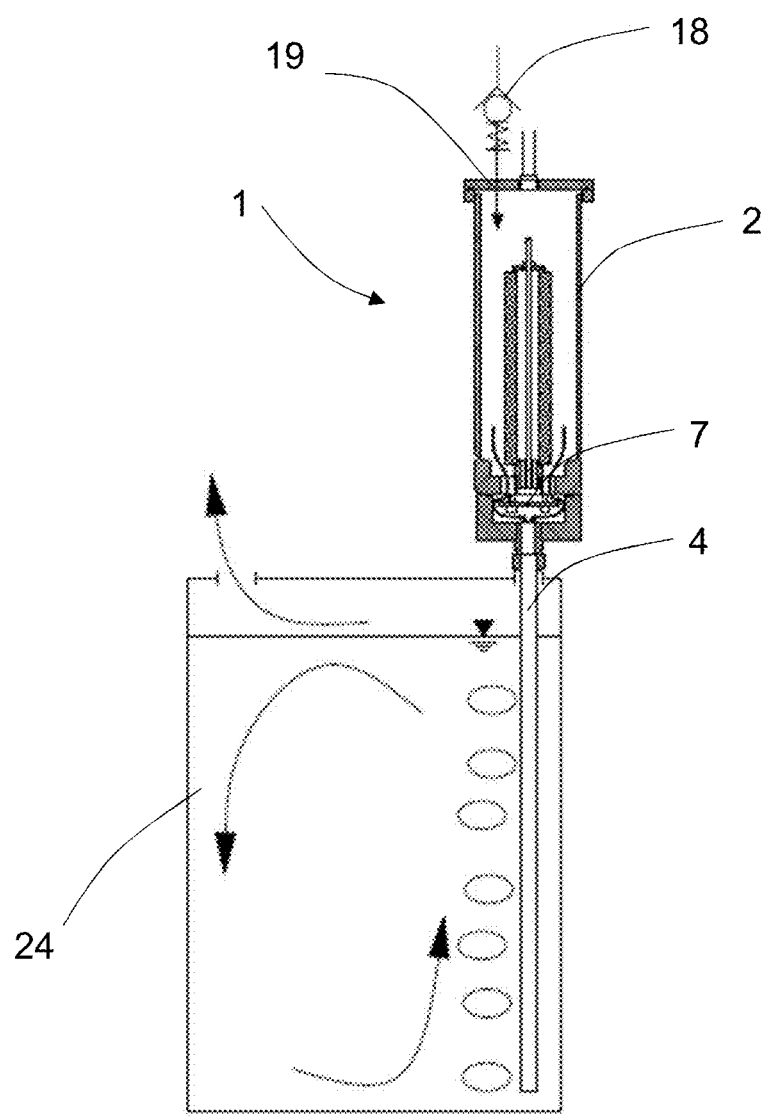
FIG. 4 shows schematically, a cross-section of an oil dehydrator according to another embodiment of the disclosure.

In FIG. 4, a further alternative embodiment of the oil dehydrator 1 is shown, where a second air inlet opening 19 is arranged at the upper end region 8 of the vacuum chamber 2. The second air inlet opening 19 allows compressed air from a compressed air source to flow into the vacuum chamber 2 via a preloaded check valve 18. The preloaded check valve 18 is configured to switch an operational state between an open mode allowing compressed air to flow into the vacuum chamber 2 through the second air inlet opening 19, and a closed mode preventing compressed air to flow into the vacuum chamber 2 through the second air inlet opening 19. An orifice check valve 7 comprising a valve plate and an orifice controls the flow of oil into and out from the vacuum chamber 2, and operates in the same way as described in the embodiments above. When a negative pressure is applied to the vacuum chamber 2 with the vacuum ejector pump and the orifice check valve 7 is in the closed mode, oil is drawn from an oil reservoir 24 into the vacuum chamber 2 through a pipe 4, the orifice in the valve plate and at least one inlet flow channel. The oil flows into the vacuum chamber 2, for example through the structure of an oil filter. The oil is after dehydration, when the negative pressure is no longer applied to the vacuum chamber 2, forced to flow out from the vacuum chamber 2 through at least one outlet flow channel and the pipe 4 back into the oil reservoir 24, by a flow of compressed air applied to the vacuum chamber 2 via the preloaded check valve 18 and the second air inlet opening 19. In this way the vacuum chamber 2 can be emptied much faster by the compressed air applied. A timer valve can be used to distribute the flow of compressed air to either the vacuum ejector pump for drawing oil into the vacuum chamber or to the inlet opening 19 for forcing the oil out from the vacuum chamber 2. The check valve 18 is preloaded to a certain pressure level, for example by a spring arrangement, to prevent air to flow into the vacuum chamber 2 when the vacuum ejector pump is applying a negative pressure to the vacuum chamber 2.

In this embodiment, the air bubbles that are flowing out through the pipe 4 by the compressed air into the oil reservoir 24 can be used to circulate the oil in the oil reservoir 24, as indicated in FIG. 4. This oil circulation in the oil reservoir 24 is distributing the water contained in the oil so that a more efficient dehydration of the oil is achieved.

Figure 5A:
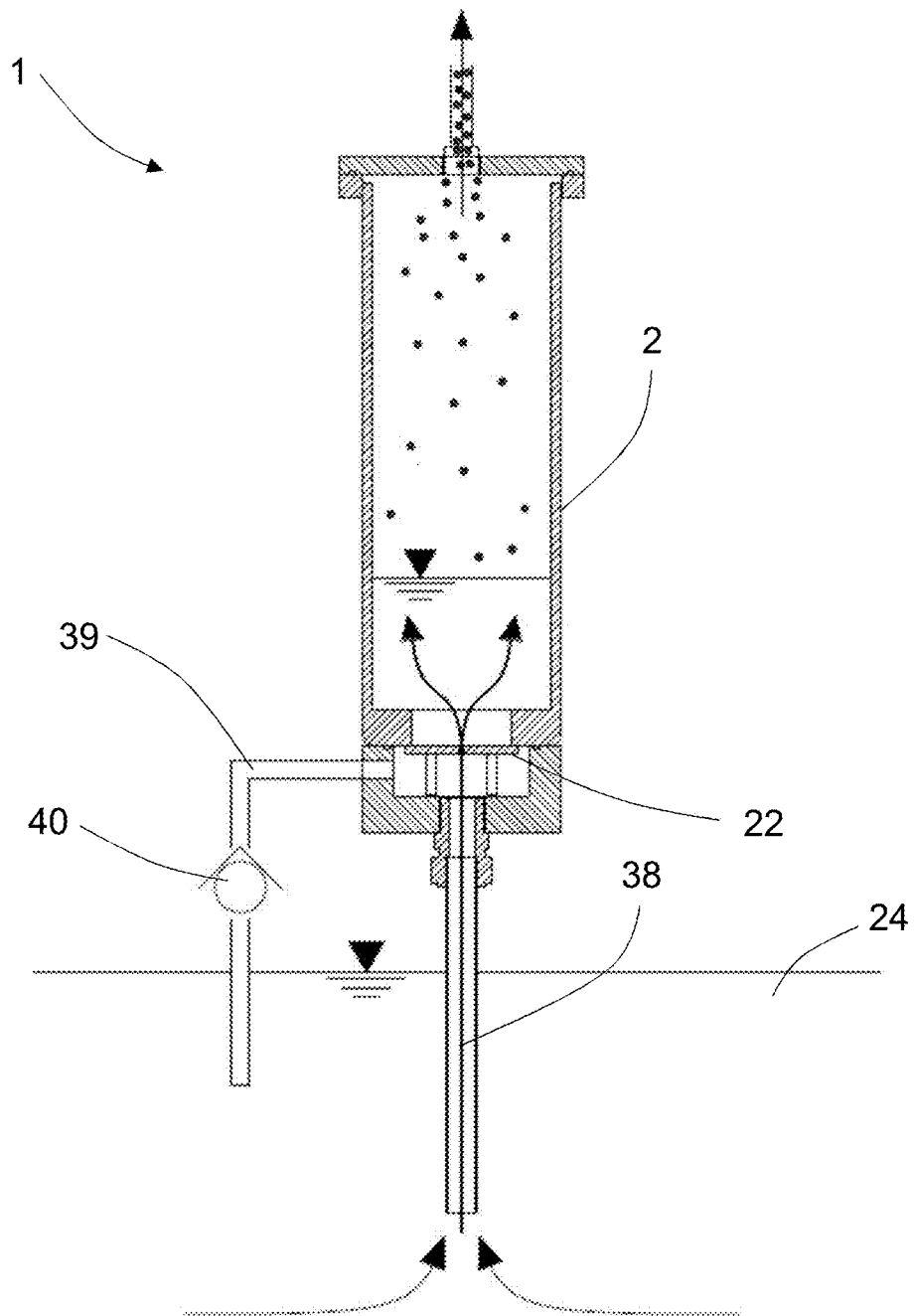
FIG. 5a-b show schematically, a cross-section of an oil dehydrator according to another embodiment of the disclosure.
Figure 5B:
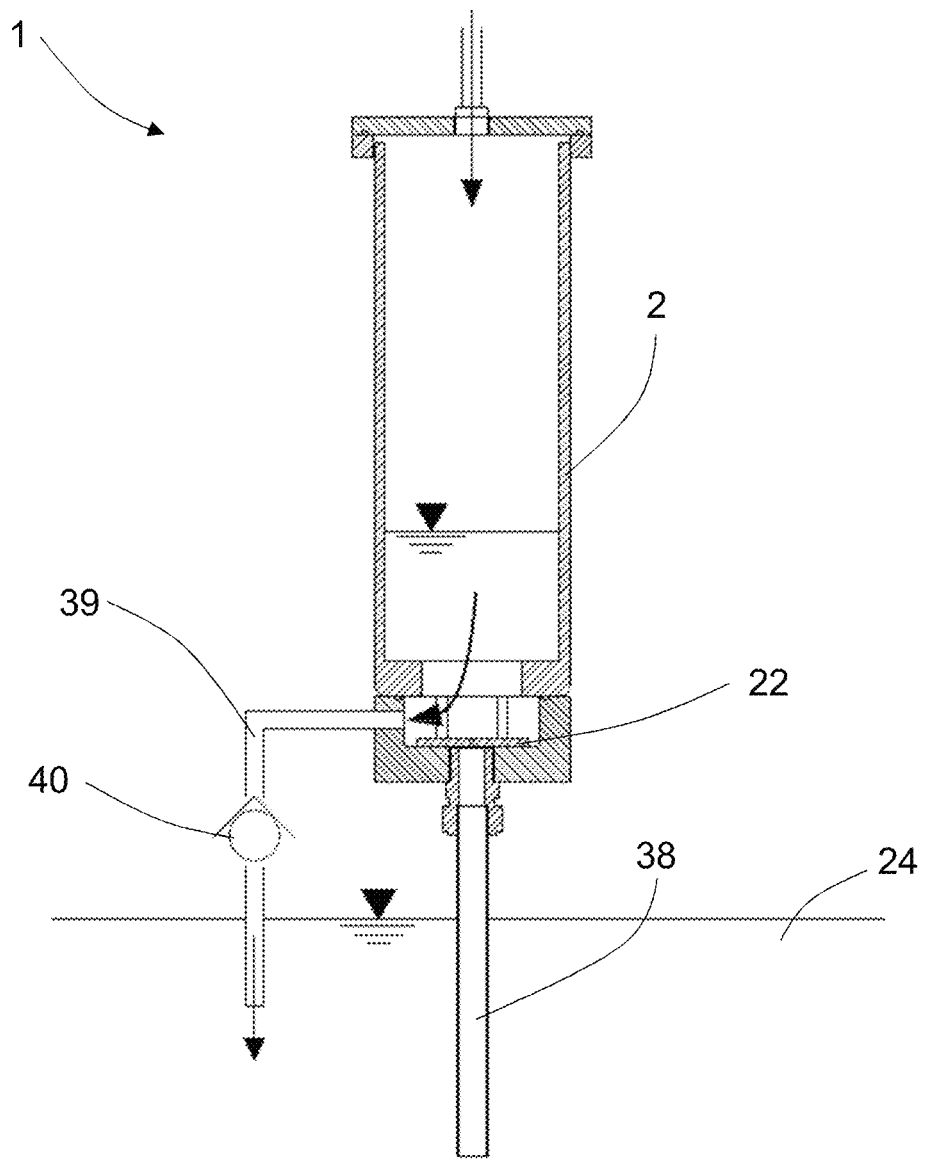

In an alternative embodiment, shown in FIGS. 5a and 5b, instead of using only one pipe for the flow of oil into and out from the oil dehydrator 1, a first pipe 38 can be used for the flow of oil into the vacuum chamber 2 from the oil reservoir 24 and another second pipe 39 for the flow of oil out from the vacuum chamber 2 back to the oil reservoir 24. The first pipe 38 and the second pipe 39 may also as an alternative be arranged with different flow channels into the vacuum chamber 2. It is with this arrangement when having two separate pipes also possible to transport the dehydrated oil from the vacuum chamber 2 through the second pipe 39 to another oil reservoir different than the oil reservoir 24 from which the oil was drawn into the vacuum chamber 2. If compressed air is applied to the vacuum chamber 2 when emptying the vacuum chamber, the flow of oil out from the vacuum chamber can be transported efficiently through the second pipe 39. The flow of oil into and out from the vacuum chamber 2 is controlled by an orifice check valve of the type described in the earlier embodiments. When emptying the vacuum chamber 2, as shown in FIG. 5b, the main flow of oil into the first pipe 38 is closed by a valve plate 22 so that oil is not flowing out from the vacuum chamber through the first pipe 38, but instead is flowing out through the second pipe 39. A very small amount of oil may flow out from the vacuum chamber 2 through the orifice of the valve plate 22 into the first pipe 38, but this small flow of oil will not impact the functionality of the oil dehydrator 1. When oil is drawn into the vacuum chamber 2, as shown in FIG. 5a, the valve plate 22 is in an upper position as described in the earlier embodiments. A pipe check valve 40 is blocking the flow of oil in the second pipe 39 when oil is drawn into the vacuum chamber 2, but allows oil to flow out from the vacuum chamber 2 through the second pipe 39 when the vacuum chamber is emptied.

The oil dehydrator may be operated without any electrical components, since the only power source used is compressed air. This makes the oil dehydrator suitable to use in hazardous locations or explosion proof areas. Due to the compact design of the oil dehydrator, it can be designed as a portable unit, which is easy to move from one oil reservoir to another. As an alternative the oil dehydrator may be designed as a stationary unit permanently attached to an oil reservoir. Further, the oil in the oil dehydrator is thoroughly emptied when the dehydration process is completed so that no oil residues are contained in the oil dehydrator. This means that there is no or a very little risk that one type of oil can be contaminated with oil residues of another type if oil systems with different oil types are being cleaned with the same oil dehydrator.

Figure 6:
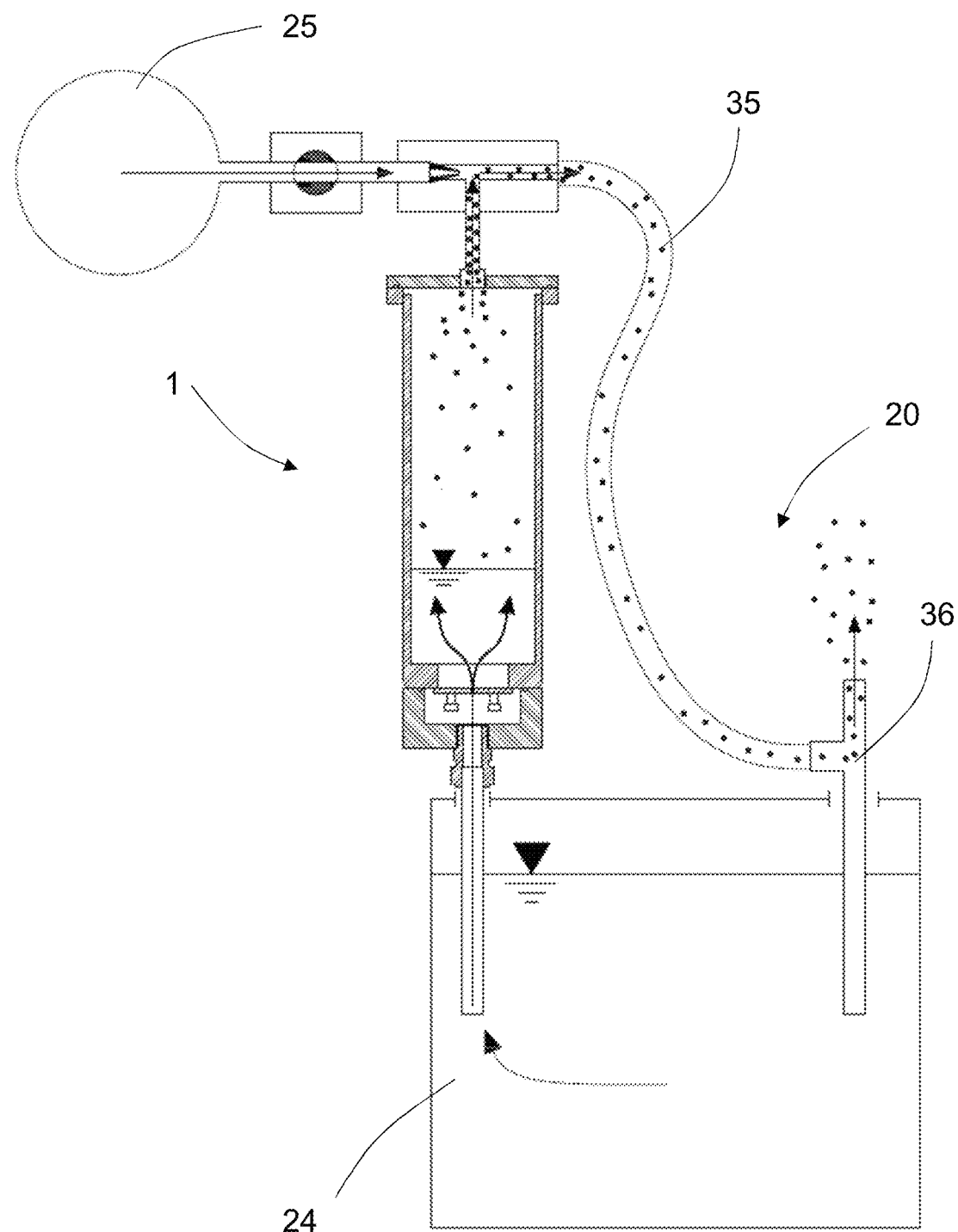
FIG. 6 shows schematically, an oil dehydration system according to the disclosure.

As shown in FIG. 6, a suitable system for dehydrating oil comprises an oil dehydrator 1, an oil reservoir 24 and a compressed air source 25. Further, the system may also comprise an oil separating unit 20 that is used for separating oil that may follow the flow of air and water out from the vacuum ejector pump from the vacuum chamber. The oil separation unit 20 comprises an outlet pipe 35 and an oil separation pipe 36. The outlet pipe 35 is in a first end attached to the pump outlet opening of the vacuum ejector pump and in a second end attached to the oil separation pipe 36, between a lower end and an upper end of the oil separation pipe 36. If a mixture of air, water and oil is flowing out from the vacuum ejector pump, the mixture is transported in the outlet pipe 35 into the oil separation pipe 36, where the air and evaporated water is flowing in a direction upwards in the oil separation pipe 36 into the surrounding air, and the oil is flowing downwards in the oil separation pipe 36 back into the oil reservoir 24.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. As an example, other suitable types of orifice check valves and other fluid handling components may be used. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Oil dehydrator
2: Vacuum chamber
3: Vacuum pump
4: Pipe
5: Flow channel
6: Timer valve
7: Orifice check valve
8: Upper end region
9: Lower end region
10: Outlet opening
11: Inner tube
12: Lower tube end
13: Upper tube end
14: Spray nozzle
15: Filler material
16: First air inlet opening
17: Float valve
18: Preloaded check valve
19: Second air inlet opening
20: Oil separating unit
21: Oil filter
22: Valve plate
23: Orifice
24: Oil reservoir
25: Compressed air source
26: Pump inlet opening
27: Pump outlet opening
28: Suction inlet opening
29: Upper surface
30: Lower surface
31: Valve bolt
32: End cap
33: Floating valve element
34: Moisture sensor
35: Outlet pipe
36: Oil separation pipe
37: Hose
38: First pipe
39: Second pipe
40: Pipe check valve

The invention claimed is:

1. An oil dehydrator comprising:
a vacuum chamber, a vacuum pump arranged at an upper end region of the vacuum chamber for establishing a negative pressure within the vacuum chamber and for fluid transportation of water and air out from the vacuum chamber through an outlet opening, and a pipe for fluid transportation of oil into and/or out from the vacuum chamber, where the pipe is connected to a lower end region of the vacuum chamber,
the vacuum chamber at the lower end region having at least one flow channel fluidly connecting the vacuum chamber and the pipe, wherein an orifice check valve is arranged between the vacuum chamber and the pipe for controlling the flow of oil into and out from the vacuum chamber through the at least one flow channel.

2. An oil dehydrator according to claim 1, wherein the orifice check valve is configured to switch an operational state between an open mode allowing oil to flow out from the vacuum chamber, and a closed mode, wherein the orifice check valve is controlling the flow of oil through the at least one flow channel into the vacuum chamber so that a flow area in the closed mode is lower than the flow area in the open mode.

3. An oil dehydrator according to claim 2, wherein the orifice check valve comprises a valve plate with at least one orifice, where the valve plate is arranged for controlling the flow of oil out from the vacuum chamber through the at least one flow channel, allowing oil to flow into the at least one flow channel through the at least one orifice, when the orifice check valve is in its closed mode.

4. An oil dehydrator according to claim 1, wherein the vacuum chamber has at least one inlet flow channel at the lower end region, and at least one outlet flow channel at the lower end region, where the at least one outlet flow channel is separately arranged from the at least one inlet flow channel.

5. An oil dehydrator according to claim 1, wherein the vacuum pump is a vacuum ejector pump.

6. An oil dehydrator according to claim 5, wherein the vacuum pump is connected to a timer valve, which is controlling a flow of compressed air through the vacuum ejector pump, where the timer valve is configured to switch an operational state between an open mode allowing compressed air to flow through the vacuum ejector pump, and a closed mode preventing compressed air to flow through the vacuum ejector pump.

7. An oil dehydrator according to claim 1, wherein an inner tube is arranged inside the vacuum chamber, where the inner tube has a lower tube end that is in fluid communication with the at least one flow channel, and an upper tube end provided with at least one spray nozzle, where the spray nozzle is arranged for spraying oil into the vacuum chamber.

8. An oil dehydrator according to claim 1, wherein the vacuum chamber is filled with a filler material that is increasing the contact surface area between the oil and the air in the vacuum chamber.

9. An oil dehydrator according to claim 8, wherein the filler material is a random packing material.

10. An oil dehydrator according to claim 1, wherein a first air inlet opening is arranged in the lower end region of the vacuum chamber, where the first air inlet opening allows air to flow into the vacuum chamber.

11. An oil dehydrator according to claim 1, wherein a float valve is arranged inside the vacuum chamber at the upper end region for controlling the fluid transportation of water and air out from the vacuum chamber through the outlet opening, where the float valve is configured to switch an operational state between an open mode allowing water and air to flow out from the vacuum chamber through the outlet opening, and a closed mode preventing water and air to flow out from the vacuum chamber through the outlet opening.

12. An oil dehydrator according to claim 1, wherein an oil filter is arranged inside the vacuum chamber downstream of the at least one flow channel.

13. An oil dehydrator according to claim 1, wherein a second air inlet opening is arranged at the upper end region of the vacuum chamber, where the second air inlet opening allows compressed air to flow into the vacuum chamber via a preloaded check valve, where the preloaded check valve is configured to switch an operational state between an open mode allowing compressed air to flow into the vacuum chamber through the second air inlet opening, and a closed mode preventing compressed air to flow into the vacuum chamber through the second air inlet opening.

14. A system for dehydrating oil comprising an oil dehydrator according to claim 1, wherein the system further comprises an oil reservoir and a compressed air source.

15. A system for dehydrating oil according to claim 14, wherein the system further comprises an oil separating unit.

16. A method for dehydrating oil with an oil dehydrator, wherein the oil dehydrator comprises a vacuum chamber; a vacuum pump arranged at an upper end region of the vacuum chamber for establishing a negative pressure within the vacuum chamber and for fluid transportation of water and air out from the vacuum chamber through an outlet opening; a pipe for fluid transportation of oil into and/or out from the vacuum chamber, and where the pipe is connected to a lower end region of the vacuum chamber; where the vacuum chamber at the lower end region has at least one flow channel fluidly connecting the vacuum chamber and the pipe; and wherein an orifice check valve is arranged between the vacuum chamber and the pipe for controlling the flow of oil into and out from the vacuum chamber through the at least one flow channel, the method comprising:

applying a negative pressure to the vacuum chamber with the vacuum pump and switching an operational state of the orifice check valve to a closed mode, in which oil is prevented from flowing out from the vacuum chamber, drawing oil into the vacuum chamber from an oil reservoir through the pipe and the at least one flow channel, and transporting water and air out from the vacuum chamber with the vacuum pump through the outlet opening, stop applying the negative pressure to the vacuum chamber with the vacuum pump and switching the operational state of the orifice check valve to an open mode, wherein oil is flowing out from the vacuum chamber through the at least one flow channel.

17. A method for dehydrating oil according to claim 16, wherein the orifice check valve is switching the operational state to the closed mode by the flow of oil drawn into the vacuum chamber when the negative pressure is applied to the vacuum chamber; and wherein the orifice check valve is switching the operational state to the open mode by the flow of oil out from the vacuum chamber when the negative pressure is no longer applied to the vacuum chamber.

18. A method for dehydrating oil according to claim 16, wherein an inner tube is arranged inside the vacuum chamber, and where the inner tube has a lower tube end that is in fluid communication with the at least one flow channel, and an upper tube end provided with at least one spray nozzle, and wherein the spray nozzle is spraying oil into the upper end region of the vacuum chamber when the vacuum pump is applying a negative pressure to the vacuum chamber and the orifice check valve is in the closed mode.

19. A method for dehydrating oil according to claim 16, wherein air is flowing into the vacuum chamber through a first air inlet opening arranged in the lower end region of the vacuum chamber when the vacuum pump is applying a negative pressure to the vacuum chamber and the orifice check valve is in the closed mode.

20. A method for dehydrating oil according to claim 16, wherein a flow of compressed air is applied to the vacuum chamber via a preloaded check valve and a second air inlet opening arranged at the upper end region of the vacuum chamber, when the negative pressure is no longer applied to the vacuum chamber, so that oil is forced to flow out from the vacuum chamber through the at least one flow channel.

* * * * *